United States Patent
Zhang

(10) Patent No.: US 10,354,601 B2
(45) Date of Patent: Jul. 16, 2019

(54) DC VOLTAGE CONVERSION CIRCUIT, DC VOLTAGE CONVERSION METHOD AND LIQUID CRYSTAL DISPLAY DEVICE

(71) Applicant: Shenzhen China Star Optoelectronics Semiconductor Display Technology Co., Ltd., Shenzhen (CN)

(72) Inventor: Xianming Zhang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 58 days.

(21) Appl. No.: 15/579,945

(22) PCT Filed: Nov. 16, 2017

(86) PCT No.: PCT/CN2017/111421
§ 371 (c)(1),
(2) Date: Dec. 6, 2017

(87) PCT Pub. No.: WO2019/015183
PCT Pub. Date: Jan. 24, 2019

(65) Prior Publication Data
US 2019/0027105 A1    Jan. 24, 2019

(30) Foreign Application Priority Data
Jul. 19, 2017    (CN) .......................... 2017 1 0591450

(51) Int. Cl.
*G09G 3/36*    (2006.01)
*H02M 3/07*    (2006.01)
(Continued)

(52) U.S. Cl.
CPC .................. *G09G 3/36* (2013.01); *G09G 3/20* (2013.01); *G09G 3/3696* (2013.01); *H02M 3/07* (2013.01);
(Continued)

(58) Field of Classification Search
CPC . G09G 3/36; G09G 3/20; H02M 3/07; H02M 3/08
See application file for complete search history.

(56) References Cited

U.S. PATENT DOCUMENTS 9,054,576 B2 *    6/2015    Kang ...................... H02M 3/07
9,431,824 B2 *    8/2016    Ishigaki ................ H02M 3/158
(Continued)

FOREIGN PATENT DOCUMENTS

CN    103475213 A    12/2013

*Primary Examiner* — Pegeman Karimi
(74) *Attorney, Agent, or Firm* — Leong C. Lei

(57)    ABSTRACT

The present invention provides a DC voltage conversion circuit, a DC voltage conversion method, and a liquid crystal display device. The DC voltage conversion circuit comprises a first diode, a second diode, a third diode, a fourth diode, a first capacitor, a second capacitor, a third capacitor, a fourth capacitor, a voltage dividing unit, and a switching unit. The second terminal of the first capacitor is connected with the first voltage-transforming signal and the second terminal of the third capacitor is connected with the second voltage-transforming signal. The first and second voltage-transforming signals are both pulse signals, and the first and second voltage-transforming signals have opposite phases. Comparing the present invention and the conventional art, the present invention can quickly complete the transformation of the input voltage, to reduce the require time for completing the voltage transformation, which has strong driving capability and fast response speed.

8 Claims, 5 Drawing Sheets

(51) Int. Cl.
*H02M 3/08* (2006.01)
*G09G 3/20* (2006.01)

(52) U.S. Cl.
CPC ...... *H02M 3/08* (2013.01); *G09G 2320/0204* (2013.01); *G09G 2320/0252* (2013.01); *G09G 2330/02* (2013.01); *G09G 2330/028* (2013.01); *H02M 2003/077* (2013.01)

(56) References Cited

U.S. PATENT DOCUMENTS

| | | | | |
|---|---|---|---|---|
| 2004/0145584 | A1* | 7/2004 | Lee | G09G 3/36 345/212 |
| 2009/0033289 | A1* | 2/2009 | Xing | H02J 7/0065 320/140 |
| 2012/0126764 | A1* | 5/2012 | Urakabe | H02M 3/07 323/282 |
| 2016/0255335 | A1* | 9/2016 | Guo | G02B 27/26 348/58 |

* cited by examiner

DC VOLTAGE CONVERSION CIRCUIT, DC VOLTAGE CONVERSION METHOD AND LIQUID CRYSTAL DISPLAY DEVICE

BACKGROUND OF THE INVENTION

Field of Invention

The present invention relates to the field of liquid crystal display, and more particularly to a DC voltage conversion circuit, a DC voltage conversion method and a liquid crystal display device.

Description of Prior Art

The Liquid crystal display (Liquid Crystal Display, LCD) is one of the most widely used flat panel display device, the liquid crystal panel is a core component of liquid crystal display device. Generally, the liquid crystal panel is constituted of a color filter substrate (CF Substrate), a thin film transistor array substrate (TFT Array Substrate), and a liquid crystal layer (Liquid Crystal Layer) disposed between the two substrates. Generally, an array substrate and a CF substrate are provided with pixel electrodes and common electrodes. When voltage is applied to the pixel electrodes and the common electrodes, an electric field is generated in the liquid crystal layer which determines the orientation of the liquid crystal molecules, so as to adjust the polarization of the light incident to the liquid crystal layer, so that the liquid crystal panel displays an image.

In the conventional art, when the TFT-LCD is driven, a variety of voltages are input to the TFT-LCD, the voltages include a power supply voltage (VDD), a constant high voltage (VGH), and a constant low voltage (VGL). Among them, VGH and VGL correspond with smaller currents, which are generally generated by charge pumps which are low-cost.

Please refer to FIG. 1, which is charge pump circuit for generating a constant high-level voltage, which comprises a first diode D10, a second diode D20, a third diode D30, a fourth diode D40, a first capacitor C10, a second capacitor C20, a third capacitor C30, and a fourth capacitor C40. Wherein an anode of the first diode D10 is connected with an input voltage Vin and a cathode of the first diode D10 is electrically connected with an anode of the second diode D20, a cathode of the second diode D20 is electrically connected with an anode of the third diode D30 and a cathode of the third diode D30 is electrically connected with an anode of the fourth diode D40, a cathode of the fourth diode D40 outputs an output voltage Vout. A first terminal of the first capacitor C10 is electrically connected with the cathode of the first diode D10, a second terminal of the first capacitor C10 is connected with a voltage-transforming signal DRP. A first terminal of the second capacitor C20 is electrically connected with the cathode of the second diode D20 and a second terminal of the second capacitor C20 is grounded. A first terminal of the third capacitor C30 is electrically connected with the cathode of the third diode D30 and a second terminal of the third capacitor C30 is connected with the voltage-transforming signal DRP. A first terminal of the fourth capacitor C40 is electrically connected with the cathode of the fourth diode D40 and the second terminal of the fourth capacitor C40 is grounded. The voltage-transforming signal DRP is a pulse signal with alternative low-level and high-level, the voltage of the low-level is 0 volt, the high voltage is equal to the input voltage Vin.

Please refer to FIG. 2, when the charge pump circuit boosts the input voltage Vin, the voltage-transforming DRP is 0 volt, cathode voltages V10, V20, V30 of the first, second, and third diodes D10, D20, D30 and the cathode voltage of the fourth diode D40 (the output voltage Vout) all are the input voltages Vin. Then, the voltage-transforming signal DRP becomes the input voltage Vin, the cathode voltages V10, V20, V30 of the first, second, and third diodes D10, D20, D30 and the cathode voltage of the fourth diode D40 (the output voltage Vout) all become to twice of the input voltages Vin. After that, the voltage-transforming signal DRP becomes 0 volt, the cathode voltages V10, V20, V30 of the first, second, and third diodes D10, D20, D30 and the cathode voltage of the fourth diode D40 (the output voltage Vout) all keep as twice the input voltages Vin. After that, the voltage-transforming signal DRP becomes the input voltage Vin again, the cathode voltage V30 of the third diodes D30 and the cathode voltage of the fourth diode D40 (the output voltage Vout) both become as three times of the input voltages Vin. In other words, it takes two cycles of the voltage-transforming signal DRP to complete the boost of the input voltage Vin, the driving capability is insufficient and the response speed is slow.

SUMMARY OF THE INVENTION

An object of the present invention is to provide a DC voltage conversion circuit, which can quickly complete the conversion of the input voltage with strong driving ability and fast response speed.

Another object of the present invention is to provide a DC voltage conversion method, which can quickly complete the conversion of the input voltage with strong driving ability and fast response speed.

Another object of the present invention is to provide a liquid crystal display device, which has strong driving ability and fast response speed.

In order to achieve the object, the present invention provides a DC voltage conversion circuit, which comprises a first diode, a second diode, a third diode, a fourth diode, a first capacitor, a second capacitor, a third capacitor, a fourth capacitor, a voltage dividing unit, and a switching unit.

An anode of the first diode is connected with an input voltage and a cathode of the first diode is electrically connected with an anode of the second diode. A cathode of the second diode is electrically connected with an anode of the third diode. A cathode of the third diode is electrically connected with an anode of the fourth diode. A cathode of the fourth diode outputs an output voltage. A first terminal of the voltage dividing unit electrically connected with the anode of the first diode, a second terminal of the voltage dividing unit is connected with a drain electrode of the switching unit. A gate electrode of the switching unit is connected with a first voltage-transforming signal, a source electrode of the switching unit is grounded, and the drain electrode of the switching unit is also connected with a second voltage-transforming signal. A first terminal of the first capacitor is electrically connected with the cathode of the first diode and a second terminal of the first capacitor is connected with the first voltage-transforming signal. A first terminal of the second capacitor is electrically connected with the cathode of the second diode and a second terminal of the second capacitor is grounded. A first terminal of the third capacitor is electrically connected with the cathode of the third diode and a second terminal of the third capacitor is electrically connects the drain electrode of the switching unit. A first terminal of the fourth capacitor is electrically connected with the cathode of the fourth diode, a second terminal of the fourth capacitor is grounded.

The first voltage-transforming signal is a pulse signal with alternative low-level and high-level, or the first voltage-transforming signal is a pulse signal with alternative high-level and low-level.

The first voltage-transforming signal and the second voltage-transforming signal have opposite phases.

A high level voltage of the first voltage-transforming signal is equal to the input voltage and a low level voltage of the first voltage-transforming signal is 0 volt.

The voltage dividing unit is a resistor.

The switching unit is a N-type field effect transistor.

The present invention further provides a DC voltage conversion method, which comprises:

Step S1, providing a DC voltage conversion circuit, which comprises a first diode, a second diode, a third diode, a fourth diode, a first capacitor, a second capacitor, a third capacitor, a fourth capacitor, a voltage dividing unit, and a switching unit.

An anode of the first diode is connected with an input voltage and a cathode of the first diode is electrically connected with an anode of the second diode. A cathode of the second diode is electrically connected with an anode of the third diode. A cathode of the third diode is electrically connected with an anode of the fourth diode. A cathode of the fourth diode outputs an output voltage. A first terminal of the voltage dividing unit electrically connected with the anode of the first diode, a second terminal of the voltage dividing unit is connected with a drain electrode of the switching unit. A gate electrode of the switching unit is connected with a first voltage-transforming signal, a source electrode of the switching unit is grounded, and the drain electrode of the switching unit is also connected with a second voltage-transforming signal. A first terminal of the first capacitor is electrically connected with the cathode of the first diode and a second terminal of the first capacitor is connected with the first voltage-transforming signal. A first terminal of the second capacitor is electrically connected with the cathode of the second diode and a second terminal of the second capacitor is grounded. A first terminal of the third capacitor is electrically connected with the cathode of the third diode and a second terminal of the third capacitor is electrically connects the drain electrode of the switching unit. A first terminal of the fourth capacitor is electrically connected with the cathode of the fourth diode, a second terminal of the fourth capacitor is grounded.

Step S2, the first voltage-transforming signal is 0 volt, the second voltage-transforming signal is the input voltage, an cathode voltage of the fourth diode is twice the input voltage.

Step S3, the first voltage-transforming signal is changed into the input voltage, the second voltage-transforming signal is changed into 0 volt, and the cathode voltage of the fourth diode is kept as twice the input voltage.

Step S4, the first voltage-transforming signal is changed into 0 volt, the second voltage-transforming signal is changed into the input voltage, and the cathode voltage of the fourth diode is changed into three times the input voltage.

The voltage dividing unit is a resistor.

The switching unit is a N-type field effect transistor.

The present invention further provides a DC voltage conversion method, which comprises:

Step S1', providing a DC voltage conversion circuit, which comprises a first diode, a second diode, a third diode, a fourth diode, a first capacitor, a second capacitor, a third capacitor, a fourth capacitor, a voltage dividing unit, and a switching unit.

An anode of the first diode is connected with an input voltage and a cathode of the first diode is electrically connected with an anode of the second diode. A cathode of the second diode is electrically connected with an anode of the third diode. A cathode of the third diode is electrically connected with an anode of the fourth diode. A cathode of the fourth diode outputs an output voltage. A first terminal of the voltage dividing unit electrically connected with the anode of the first diode, a second terminal of the voltage dividing unit is connected with a drain electrode of the switching unit. A gate electrode of the switching unit is connected with a first voltage-transforming signal, a source electrode of the switching unit is grounded, and the drain electrode of the switching unit is also connected with a second voltage-transforming signal. A first terminal of the first capacitor is electrically connected with the cathode of the first diode and a second terminal of the first capacitor is connected with the first voltage-transforming signal. A first terminal of the second capacitor is electrically connected with the cathode of the second diode and a second terminal of the second capacitor is grounded. A first terminal of the third capacitor is electrically connected with the cathode of the third diode and a second terminal of the third capacitor is electrically connects the drain electrode of the switching unit. A first terminal of the fourth capacitor is electrically connected with the cathode of the fourth diode, a second terminal of the fourth capacitor is grounded.

Step S2', the first voltage-transforming signal is the input voltage, the second voltage-transforming signal is 0 volt, an cathode voltage of the fourth diode is twice the input voltage.

Step S3', the first voltage-transforming signal is changed into 0 volt, the second voltage-transforming signal is changed into twice the input voltage, and the cathode voltage of the fourth diode is changed into three times the input voltage.

The voltage dividing unit is a resistor.

The switching unit is a N-type field effect transistor.

The present invention further provides a liquid crystal display device, which comprises the above DC voltage conversion circuit.

The beneficial effects of the present invention are: the present invention provides a DC voltage conversion circuit, which comprises a first diode, a second diode, a third diode, a fourth diode, a first capacitor, a second capacitor, a third capacitor, a fourth capacitor, a voltage dividing unit, and a switching unit. The second terminal of the first capacitor is connected with the first voltage-transforming signal and the second terminal of the third capacitor is connected with the second voltage-transforming signal. The first and second voltage-transforming signals are both pulse signals, and the first and second voltage-transforming signals have opposite phases. Comparing the present invention and the conventional art, the present invention can quickly complete the transformation of the input voltage, to reduce the require time for completing the voltage transformation, which has strong driving capability and fast response speed. The present invention provides a DC voltage conversion method, which can quickly complete the conversion of the input voltage with strong driving ability and fast response speed. The present invention provides a liquid crystal display device, which has strong driving ability and fast response speed.

BRIEF DESCRIPTION OF THE DRAWINGS

For further understanding of the features and technical contents of the present invention, reference should be made to the following detailed description and accompanying drawings of the present invention. However, the drawings are for reference only and are not intended to limit the present invention.

In drawings.

DETAILED DESCRIPTION OF THE PREFERRED EMBODIMENTS

The technical means and the effects thereof will be further described with reference to the preferred embodiments of the present invention and their accompanying drawings.

Figure 1:
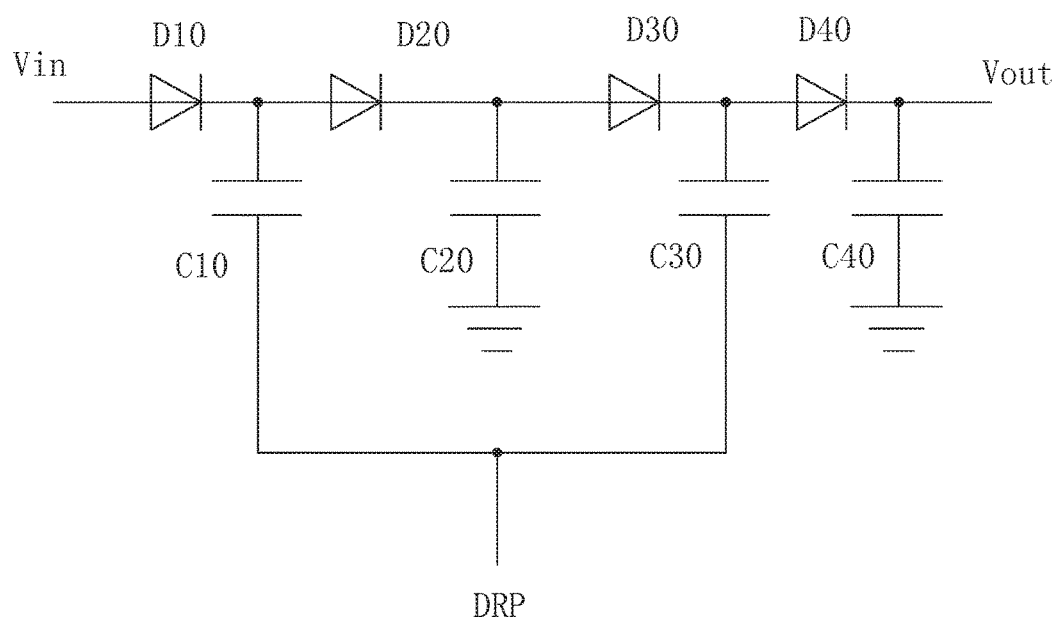
FIG. 1 is a circuit diagram of a conventional charge pump.
Figure 2:
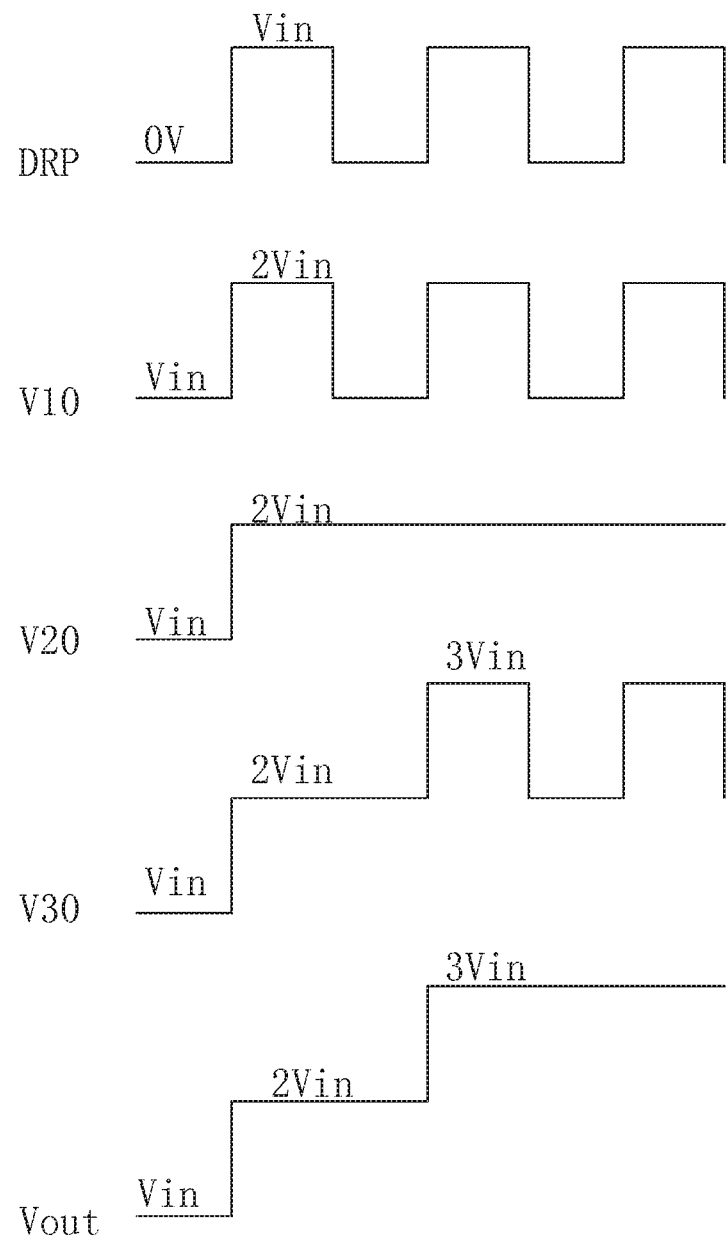
FIG. 2 is a working time-domain diagram of the charge pump shown in FIG. 1.

Please refer to FIG. 2, the present invention provides a DC voltage conversion circuit, which comprises a first diode D1, a second diode D2, a third diode D3, a fourth diode D4, a first capacitor C1, a second capacitor C2, a third capacitor C3, a fourth capacitor C4, a voltage dividing unit R1, and a switching unit Q1.

Specifically, the connecting method of each element are as below:

An anode of the first diode D1 is connected with an input voltage Vin and a cathode of the first diode D1 is electrically connected with an anode of the second diode D2. A cathode of the second diode D2 is electrically connected with an anode of the third diode D3. A cathode of the third diode D3 is electrically connected with an anode of the fourth diode D4. A cathode of the fourth diode D4 outputs an output voltage Vout. A first terminal of the voltage dividing unit R1 electrically connected with the anode of the first diode D1, a second terminal of the voltage dividing unit R1 is connected with a drain electrode of the switching unit Q1. A gate electrode of the switching unit Q1 is connected with a first voltage-transforming signal DRP1, a source electrode of the switching unit Q1 is grounded, and the drain electrode of the switching unit Q1 is also connected with a second voltage-transforming signal DRP2. A first terminal of the first capacitor C1 is electrically connected with the cathode of the first diode D1 and a second terminal of the first capacitor C1 is connected with the first voltage-transforming signal DRP1. A first terminal of the second capacitor C2 is electrically connected with the cathode of the second diode D2 and a second terminal of the second capacitor C2 is grounded. A first terminal of the third capacitor C3 is electrically connected with the cathode of the third diode D3 and a second terminal of the third capacitor C3 is electrically connects the drain electrode of the switching unit Q1. A first terminal of the fourth capacitor C4 is electrically connected with the cathode of the fourth diode D4, a second terminal of the fourth capacitor C4 is grounded.

The first voltage-transforming signal DRP1 is a pulse signal with alternative low-level and high-level, or the first voltage-transforming signal DRP1 is a pulse signal with alternative high-level and low-level.

The first voltage-transforming signal DRP1 and the second voltage-transforming signal DRP2 have opposite phases.

Specifically, the voltage dividing unit R1 is a resistor.

Specifically, the switching unit Q1 is a N-type field effect transistor.

Preferably, a high level voltage of the first voltage-transforming signal DRP1 is equal to the input voltage Vin and a low level voltage of the first voltage-transforming signal DRP1 is 0 volt. Correspondingly, a high level voltage of the second voltage-transforming signal DRP2 is equal to the input voltage Vin and a low level voltage of the second voltage-transforming signal DRP2 is 0 volt.

Please refer to FIGS. 3-4, in the first embodiment of the present invention, the first voltage-transforming signal DRP1 is a pulse signal with alternative low-level and high-level, the high level voltage of the first voltage-transforming signal DRP1 is equal to the input voltage Vin and the low level voltage of the first voltage-transforming signal DRP1 is 0 volt, the working process of the first embodiment of the present invention is as below:

First, the first voltage-transforming signal DRP1 is 0 volt and is inputted to the second terminal of the first capacitor C1 and the gate electrode of the switching unit Q1, the switching unit Q1 is turned off, the second voltage-transforming signal DRP2 is the input voltage Vin and is inputted to the second terminal of the third capacitor C3. Meanwhile, the cathode voltage V1 of the first diode D1 and the cathode voltage V2 of the second diode D2 are both the input voltage Vin, the voltage at the first terminal of the third capacitor C3 (i.e., the cathode voltage V3 of the third diode D3) is increased to twice the input voltage Vin, and the cathode voltage of the fourth diode D4 (that is, the output voltage Vout) is twice the input voltage Vin.

Then, the first voltage-transforming signal DRP1 is changed into the input voltage Vin and is inputted to the second terminal of the first capacitor C1 and the gate electrode of the switching unit Q1, the switching unit Q1 is turned on, the second voltage-transforming signal DRP2 is changed into 0 volt and is inputted to the second terminal of the third capacitor C3. Meanwhile, the cathode voltage V1 of the first diode D1 and the cathode voltage V2 of the second diode D2 are both increased to twice the input voltage Vin, and the cathode voltage V3 of the third diode D3, the cathode voltage of the fourth diode D4 (i.e., the output voltage Vout) is kept twice the input voltage Vin.

Then, the first voltage-transforming signal DRP1 is changed into 0 volt and is inputted to the second terminal of the first capacitor C1 and the gate electrode of the switching unit Q1, the switching unit Q1 is turned off, the second voltage-transforming signal DRP2 is changed into the input voltage Vin and is inputted to the second terminal of the third capacitor C3, the voltage at the first terminal of the third capacitor C3 (i.e., the cathode voltage V3 of the third diode D3) is increased to three times the input voltage Vin, and the cathode voltage of the fourth diode D4 (i.e., the output voltage Vout) is also changed into three times the input voltage Vin, the conversion of the input voltage Vin is completed. In the conventional art, the conversion of the input voltage is completed by two cycles of the voltage-transforming signal. However, in the first embodiment, the conversion of the input voltage Vin is completed at the end of one cycle of the first voltage-transforming signal DRP1 and the second voltage-transforming signal DPR2, which has strong driving capability and fast response speed.

Please refer to FIGS. 3-5, in the second embodiment of the present invention, the first voltage-transforming signal DRP1 is a pulse signal with alternative high-level and low-level, the high level voltage of the first voltage-transforming signal DRP1 is equal to the input voltage Vin and the low level voltage of the first voltage-transforming signal DRP1 is 0 volt, the working process of the second embodiment of the present invention is as below:

First, the first voltage-transforming signal DRP1 is the input voltage Vin and is inputted to the second terminal of the first capacitor C1 and the gate electrode of the switching unit Q1, the switching unit Q1 is turned on, the second voltage-transforming signal DRP2 is 0 volt and is inputted to the second terminal of the third capacitor C3. Meanwhile, the cathode voltage V1 of the first diode D1 and the cathode voltage V2 of the second diode D2, the cathode voltage V3 of the third diode D3, and the cathode voltage of the fourth diode D4 (that is, the output voltage Vout) is increased to twice the input voltage Vin.

Then, the first voltage-transforming signal DRP1 is changed into 0 volt and is inputted to the second terminal of the first capacitor C1 and the gate electrode of the switching unit Q1, the switching unit Q1 is turned off, the second voltage-transforming signal DRP2 is changed into the input voltage Vin and is inputted to the second terminal of the third capacitor C3. Meanwhile, the voltage at the first terminal of the third capacitor C3 (i.e., the cathode voltage V3 of the third diode D3) is increased to three times the input voltage Vin, the cathode voltage of the fourth diode D4 (i.e., the output voltage Vout) is increased to three times the input voltage Vin, the conversion of the input voltage Vin is completed. In the conventional art, the conversion of the input voltage is completed by two cycles of the voltage-transforming signal. However, in the second embodiment of the present invention, the conversion of the input voltage Vin is completed within half cycle of the first voltage-transforming signal DRP1 and the second voltage-transforming signal DPR2, which has strong driving capability and fast response speed.

Figure 3:
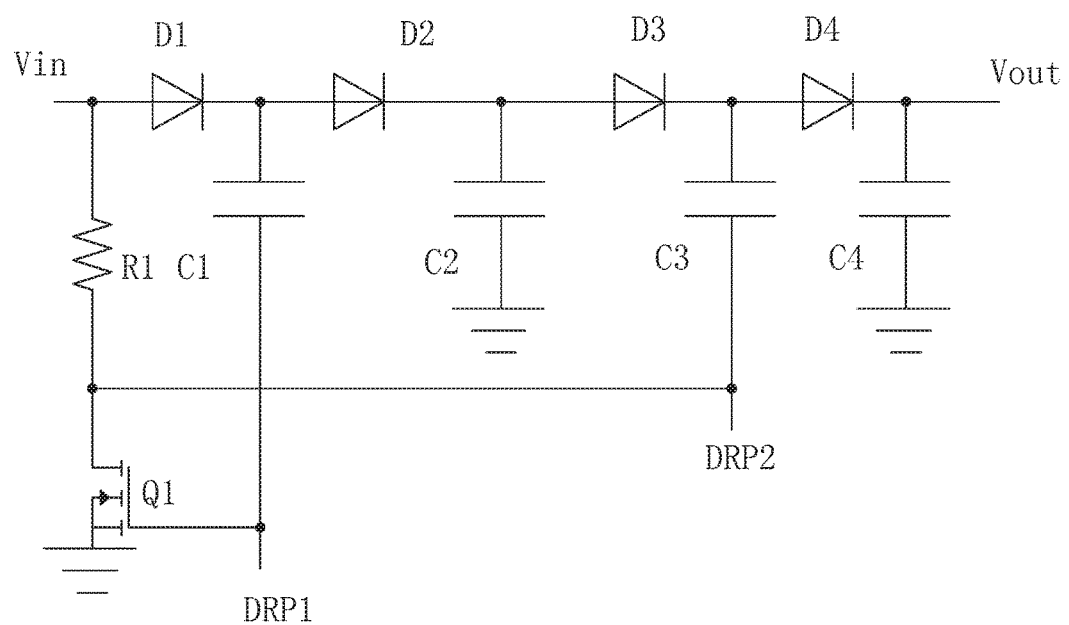
FIG. 3 is a circuit diagram of a DC voltage conversion circuit according to the present invention.
Figure 4:
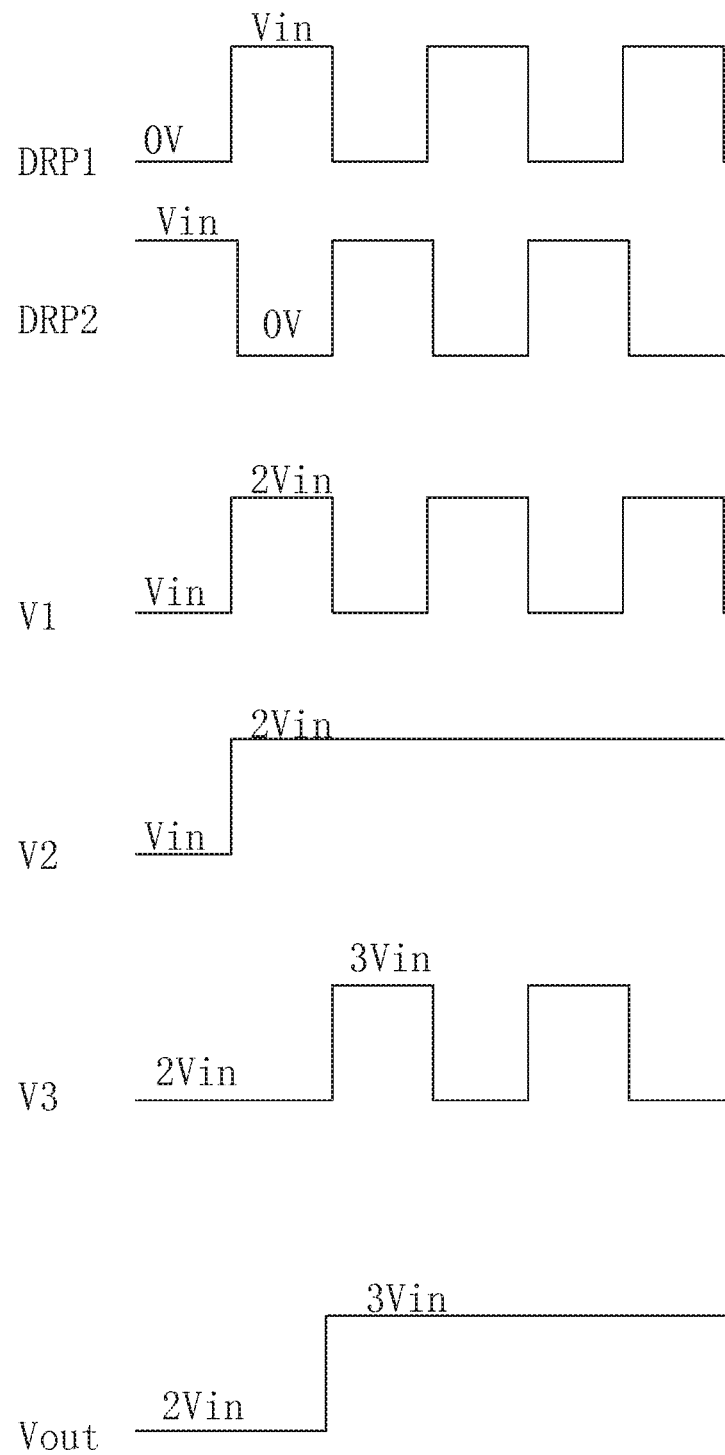
FIG. 4 is a working time-domain diagram of a first embodiment of the DC voltage conversion circuit according to the present invention.

Please refer to FIGS. 3-4, based on the same inventive concept, the present invention further provides a DC voltage conversion method, which comprises:

Step S1, providing a DC voltage conversion circuit, which comprises a first diode D1, a second diode D2, a third diode D3, a fourth diode D4, a first capacitor C1, a second capacitor C2, a third capacitor C3, a fourth capacitor C4, a voltage dividing unit R1, and a switching unit Q1.

An anode of the first diode D1 is connected with an input voltage Vin and a cathode of the first diode D1 is electrically connected with an anode of the second diode D2. A cathode of the second diode D2 is electrically connected with an anode of the third diode D3. A cathode of the third diode D3 is electrically connected with an anode of the fourth diode D4. A cathode of the fourth diode D4 outputs an output voltage Vout. A first terminal of the voltage dividing unit R1 electrically connected with the anode of the first diode D1, a second terminal of the voltage dividing unit R1 is connected with a drain electrode of the switching unit Q1. A gate electrode of the switching unit Q1 is connected with a first voltage-transforming signal DRP1, a source electrode of the switching unit Q1 is grounded, and the drain electrode of the switching unit Q1 is also connected with a second voltage-transforming signal DRP2. A first terminal of the first capacitor C1 is electrically connected with the cathode of the first diode D1 and a second terminal of the first capacitor C1 is connected with the first voltage-transforming signal DRP1. A first terminal of the second capacitor C2 is electrically connected with the cathode of the second diode D2 and a second terminal of the second capacitor C2 is grounded. A first terminal of the third capacitor C3 is electrically connected with the cathode of the third diode D3 and a second terminal of the third capacitor C3 is electrically connects the drain electrode of the switching unit Q1. A first terminal of the fourth capacitor C4 is electrically connected with the cathode of the fourth diode D4, a second terminal of the fourth capacitor C4 is grounded.

Specifically, the voltage dividing unit R1 is a resistor.

Specifically, the switching unit Q1 is a N-type field effect transistor.

Step S2, the first voltage-transforming signal DRP1 is 0 volt and is inputted to the second terminal of the first capacitor C1 and the gate electrode of the switching unit Q1, the switching unit Q1 is turned off, the second voltage-transforming signal DRP2 is the input voltage Vin and is inputted to the second terminal of the third capacitor C3. Meanwhile, the cathode voltage V1 of the first diode D1 and the cathode voltage V2 of the second diode D2 are both the input voltage Vin, the voltage at the first terminal of the third capacitor C3 (i.e., the cathode voltage V3 of the third diode D3) is increased to twice the input voltage Vin, and the cathode voltage of the fourth diode D4 (that is, the output voltage Vout) is twice the input voltage Vin.

Step S3, the first voltage-transforming signal DRP1 is changed into the input voltage Vin and is inputted to the second terminal of the first capacitor C1 and the gate electrode of the switching unit Q1, the switching unit Q1 is turned on, the second voltage-transforming signal DRP2 is changed into 0 volt and is inputted to the second terminal of the third capacitor C3. Meanwhile, the cathode voltage V1 of the first diode D1 and the cathode voltage V2 of the second diode D2 are both increased to twice the input voltage Vin, and the cathode voltage V3 of the third diode D3, the cathode voltage of the fourth diode D4 (i.e., the output voltage Vout) is kept twice the input voltage Vin.

Step S4, the first voltage-transforming signal DRP1 is changed into 0 volt and is inputted to the second terminal of the first capacitor C1 and the gate electrode of the switching unit Q1, the switching unit Q1 is turned off, the second voltage-transforming signal DRP2 is changed into the input voltage Vin and is inputted to the second terminal of the third capacitor C3, the voltage at the first terminal of the third capacitor C3 (i.e., the cathode voltage V3 of the third diode D3) is increased to three times the input voltage Vin, and the cathode voltage of the fourth diode D4 (i.e., the output voltage Vout) is also changed into three times the input voltage Vin, the conversion of the input voltage Vin is completed. In the conventional art, the conversion of the input voltage is completed by two cycles of the voltage-transforming signal. However, in the first embodiment, the conversion of the input voltage Vin is completed at the end of one cycle of the first voltage-transforming signal DRP1 and the second voltage-transforming signal DPR2, which has strong driving capability and fast response speed.

Figure 5:
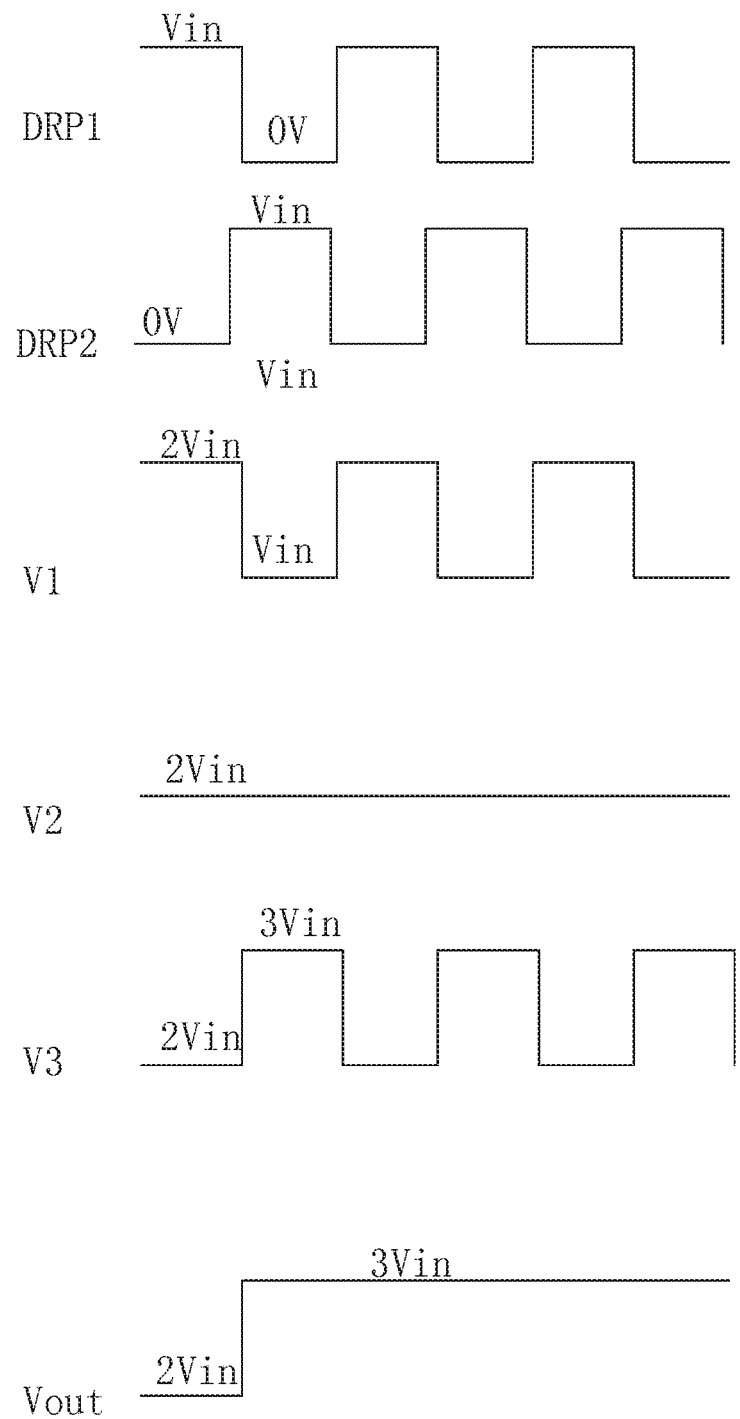
FIG. 5 is a working time-domain diagram of a second embodiment of the DC voltage conversion circuit according to the present invention.

Please refer to FIGS. 3 and 5, based on the same inventive concept, the present invention further provides another DC voltage conversion method, which comprises:

Step S1', providing a DC voltage conversion circuit, which comprises a first diode D1, a second diode D2, a third diode D3, a fourth diode D4, a first capacitor C1, a second capacitor C2, a third capacitor C3, a fourth capacitor C4, a voltage dividing unit R1, and a switching unit Q1.

An anode of the first diode D1 is connected with an input voltage Vin and a cathode of the first diode D1 is electrically connected with an anode of the second diode D2. A cathode of the second diode D2 is electrically connected with an anode of the third diode D3. A cathode of the third diode D3 is electrically connected with an anode of the fourth diode D4. A cathode of the fourth diode D4 outputs an output voltage Vout. A first terminal of the voltage dividing unit R1 electrically connected with the anode of the first diode D1, a second terminal of the voltage dividing unit R1 is connected with a drain electrode of the switching unit Q1. A gate electrode of the switching unit Q1 is connected with a first voltage-transforming signal DRP1, a source electrode of the switching unit Q1 is grounded, and the drain electrode of the switching unit Q1 is also connected with a second voltage-transforming signal DRP2. A first terminal of the first capacitor C1 is electrically connected with the cathode of the first diode D1 and a second terminal of the first capacitor C1 is connected with the first voltage-transforming signal DRP1. A first terminal of the second capacitor C2 is electrically connected with the cathode of the second diode D2 and a second terminal of the second capacitor C2 is grounded. A first terminal of the third capacitor C3 is electrically connected with the cathode of the third diode D3 and a second terminal of the third capacitor C3 is electrically connects the drain electrode of the switching unit Q1. A first terminal of the fourth capacitor C4 is electrically connected with the cathode of the fourth diode D4, a second terminal of the fourth capacitor C4 is grounded.

Specifically, the voltage dividing unit R1 is a resistor.

Specifically, the switching unit Q1 is a N-type field effect transistor.

S2', the first voltage-transforming signal DRP1 is the input voltage Vin and is inputted to the second terminal of the first capacitor C1 and the gate electrode of the switching unit Q1, the switching unit Q1 is turned on, the second voltage-transforming signal DRP2 is 0 volt and is inputted to the second terminal of the third capacitor C3. Meanwhile, the cathode voltage V1 of the first diode D1 and the cathode voltage V2 of the second diode D2, the cathode voltage V3 of the third diode D3, and the cathode voltage of the fourth diode D4 (that is, the output voltage Vout) is increased to twice the input voltage Vin.

S3', the first voltage-transforming signal DRP1 is changed into 0 volt and is inputted to the second terminal of the first capacitor C1 and the gate electrode of the switching unit Q1, the switching unit Q1 is turned off, the second voltage-transforming signal DRP2 is changed into the input voltage Vin and is inputted to the second terminal of the third capacitor C3. Meanwhile, the voltage at the first terminal of the third capacitor C3 (i.e., the cathode voltage V3 of the third diode D3) is increased to three times the input voltage Vin, the cathode voltage of the fourth diode D4 (i.e., the output voltage Vout) is increased to three times the input voltage Vin, the conversion of the input voltage Vin is completed. In the conventional art, the conversion of the input voltage is completed by two cycles of the voltage-transforming signal. However, in the second embodiment of the present invention, the conversion of the input voltage Vin is completed within half cycle of the first voltage-transforming signal DRP1 and the second voltage-transforming signal DPR2, which has strong driving capability and fast response speed.

Based on the same inventive concept, the present invention further provides a liquid crystal display device, which comprises the above DC voltage conversion circuit. Comparing the present invention and the conventional art, the present invention can quickly complete the transformation of the input voltage, to reduce the require time for completing the voltage transformation, which has strong driving capability and fast response speed. No more details about the specific structure of the DC voltage conversion circuit.

As mentioned above, the DC voltage conversion circuit of the present invention comprises a first diode, a second diode, a third diode, a fourth diode, a first capacitor, a second capacitor, a third capacitor, a fourth capacitor, a voltage dividing unit, and a switching unit. The second terminal of the first capacitor is connected with the first voltage-transforming signal and the second terminal of the third capacitor is connected with the second voltage-transforming signal. The first and second voltage-transforming signals are both pulse signals, and the first and second voltage-transforming signals have opposite phases. Comparing the present invention and the conventional art, the present invention can quickly complete the transformation of the input voltage, to reduce the require time for completing the voltage transformation, which has strong driving capability and fast response speed. The present invention provides a DC voltage conversion method, which can quickly complete the conversion of the input voltage with strong driving ability and fast response speed. The present invention provides a liquid crystal display device, which has strong driving ability and fast response speed.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A DC voltage conversion circuit, comprising a first diode, a second diode, a third diode, a fourth diode, a first capacitor, a second capacitor, a third capacitor, a fourth capacitor, a voltage dividing unit, and a switching unit;

an anode of the first diode being connected with an input voltage and a cathode of the first diode being electrically connected with an anode of the second diode; a cathode of the second diode being electrically connected with an anode of the third diode; a cathode of the third diode being electrically connected with an anode of the fourth diode; a cathode of the fourth diode outputting an output voltage; a first terminal of the voltage dividing unit electrically connected with the anode of the first diode, a second terminal of the voltage dividing unit being connected with a drain electrode of the switching unit; a gate electrode of the switching unit being connected with a first voltage-transforming signal, a source electrode of the switching unit being grounded, and the drain electrode of the switching unit being also connected with a second voltage-transforming signal; a first terminal of the first capacitor being electrically connected with the cathode of the first diode, a second terminal of the first capacitor being connected with the first voltage-transforming signal; a first terminal of the second capacitor being electrically connected with the cathode of the second diode and a second terminal of the second capacitor being grounded; a first terminal of the third capacitor being electrically connected with the cathode of the third diode and a second terminal of the third capacitor being electrically connects the drain electrode of the switching unit; a first terminal of the fourth capacitor being electrically connected with the cathode of the fourth diode, a second terminal of the fourth capacitor being grounded;

the first voltage-transforming signal being a pulse signal with alternative low-level and high-level, or the first voltage-transforming signal being a pulse signal with alternative high-level and low-level, the first voltage-transforming signal and the second voltage-transforming signal having opposite phases.

2. The DC voltage conversion circuit according to claim 1, wherein a high level voltage of the first voltage-transforming signal is equal to the input voltage and a low level voltage of the first voltage-transforming signal is 0 volt.

3. The DC voltage conversion circuit according to claim 1, wherein the voltage dividing unit is a resistor;

the switching unit is a N-type field effect transistor.

4. A liquid crystal display device, comprising the DC voltage conversion circuit according to claim 1.

5. A DC voltage conversion method, comprising:

step S1, providing a DC voltage conversion circuit, comprising a first diode, a second diode, a third diode, a fourth diode, a first capacitor, a second capacitor, a third capacitor, a fourth capacitor, a voltage dividing unit, and a switching unit;

an anode of the first diode being connected with an input voltage and a cathode of the first diode being electrically connected with an anode of the second diode; a cathode of the second diode being electrically connected with an anode of the third diode; a cathode of the third diode being electrically connected with an anode of the fourth diode; a cathode of the fourth diode outputting an output voltage; a first terminal of the voltage dividing unit electrically connected with the anode of the first diode, a second terminal of the voltage dividing unit being connected with a drain electrode of the switching unit; a gate electrode of the switching unit being connected with a first voltage-transforming signal, a source electrode of the switching unit being grounded, and the drain electrode of the switching unit being also connected with a second voltage-transforming signal; a first terminal of the first capacitor being electrically connected with the cathode of the first diode, a second terminal of the first capacitor being connected with the first voltage-transforming signal; a first terminal of the second capacitor being electrically connected with the cathode of the second diode and a second terminal of the second capacitor being grounded; a first terminal of the third capacitor being electrically connected with the cathode of the third diode and a second terminal of the third capacitor being electrically connects the drain electrode of the switching unit; a first terminal of the fourth capacitor being electrically connected with the cathode of the fourth diode, a second terminal of the fourth capacitor being grounded;

step S2, the first voltage-transforming signal being 0 volt, the second voltage-transforming signal being the input voltage, an cathode voltage of the fourth diode being twice the input voltage;

step S3, changing the first voltage-transforming signal to the input voltage, changing the second voltage-transforming signal to 0 volt, and keeping the cathode voltage of the fourth diode as twice the input voltage;

step S4, changing the first voltage-transforming signal to 0 volt, changing the second voltage-transforming signal to the input voltage, and changing the cathode voltage of the fourth diode to three times the input voltage.

6. The DC voltage conversion method according to claim 5, wherein the voltage dividing unit is a resistor;

the switching unit is a N-type field effect transistor.

7. A DC voltage conversion method, comprising:

step S1', providing a DC voltage conversion circuit, comprising a first diode, a second diode, a third diode, a fourth diode, a first capacitor, a second capacitor, a third capacitor, a fourth capacitor, a voltage dividing unit, and a switching unit;

an anode of the first diode being connected with an input voltage and a cathode of the first diode being electrically connected with an anode of the second diode; a cathode of the second diode being electrically connected with an anode of the third diode; a cathode of the third diode being electrically connected with an anode of the fourth diode; a cathode of the fourth diode outputting an output voltage; a first terminal of the voltage dividing unit electrically connected with the anode of the first diode, a second terminal of the voltage dividing unit being connected with a drain electrode of the switching unit; a gate electrode of the switching unit being connected with a first voltage-transforming signal, a source electrode of the switching unit being grounded, and the drain electrode of the switching unit being also connected with a second voltage-transforming signal; a first terminal of the first capacitor being electrically connected with the cathode of the first diode, a second terminal of the first capacitor being connected with the first voltage-transforming signal; a first terminal of the second capacitor being electrically connected with the cathode of the second diode and a second terminal of the second capacitor being grounded; a first terminal of the third capacitor being electrically connected with the cathode of the third diode and a second terminal of the third capacitor being electrically connects the drain electrode of the switching unit; a first terminal of the fourth capacitor being electrically connected with the cathode of the fourth diode, a second terminal of the fourth capacitor being grounded;

step S2', the first voltage-transforming signal being the input voltage, the second voltage-transforming signal being 0 volt, an cathode voltage of the fourth diode being twice the input voltage;

step S3', changing the first voltage-transforming signal to 0 volt, changing the second voltage-transforming signal to twice the input voltage, and changing the cathode voltage of the fourth diode to three times the input voltage.

8. The DC voltage conversion method according to claim 7, wherein the voltage dividing unit is a resistor;

the switching unit is a N-type field effect transistor.

* * * * *